US008849695B2

United States Patent
Lee et al.

(10) Patent No.: US 8,849,695 B2
(45) Date of Patent: Sep. 30, 2014

(54) ENERGY EFFICIENCY IMPROVEMENTS IN CLOUD-BASED ENVIRONMENTS

(76) Inventors: Haengju Lee, Webster, NY (US); Gueyoung Jung, Rochester, NY (US); Tridib Mukherjee, Bangalore (IN)

(*) Notice: Subject to any disclaimer, the term of this patent is extended or adjusted under 35 U.S.C. 154(b) by 54 days.

(21) Appl. No.: 13/586,180

(22) Filed: Aug. 15, 2012

(65) Prior Publication Data

US 2014/0052506 A1 Feb. 20, 2014

(51) Int. Cl.
G06Q 30/00 (2012.01)
G06F 11/34 (2006.01)
G06Q 30/02 (2012.01)

(52) U.S. Cl.
CPC ........ G06Q 30/0207 (2013.01); *G06F 11/3409* (2013.01)
USPC .................. 705/14.1; 705/14.39; 702/182

(58) Field of Classification Search
CPC ................................ G06Q 30/0207
USPC ....................................... 705/14.1
See application file for complete search history.

(56) References Cited

U.S. PATENT DOCUMENTS 7,894,944 B2 * 2/2011 Liu et al. .......... 700/276
8,112,250 B2 * 2/2012 Floyd et al. ........ 702/182
2004/0172308 A1 * 9/2004 Macchia ............ 705/4
2010/0324980 A1 * 12/2010 Schantz ........ 705/14.14
2011/0173329 A1 * 7/2011 Zhang et al. ........ 709/226

OTHER PUBLICATIONS

Gandhi et al., "Optimality analysis of energy-performance trade-off for server farm management", Performance Evaluation vol. 67, No. 11, 2010, pp. 1155-1171.*

* cited by examiner

*Primary Examiner* — John G Weiss
*Assistant Examiner* — Scott C Anderson
(74) *Attorney, Agent, or Firm* — Joseph E. Root (57) ABSTRACT

An energy efficient cloud-based environment includes multiple users requesting delivery of cloud-based services from a cloud service provider. Each user provides inputs for the delivery of one or more specific cloud based services. The inputs include the type of service, time frame for using the service, and either an energy efficiency level or a performance level pertaining to the service's delivery. The service provider allocates different resources to the users for delivering the requested services, and calculates an actual price and an operating energy cost for delivering the requested services to each of the users. The profit of the service provider due to users is calculated. An overall profit of the service provider associated with delivering the cloud-based services is calculated, and a fraction of the overall profit is distributed as an incentive among the users. The incentive of each user is proportional to the profit contribution of that user.

13 Claims, 4 Drawing Sheets

ENERGY EFFICIENCY IMPROVEMENTS IN CLOUD-BASED ENVIRONMENTS

TECHNICAL FIELD

Embodiments of the present disclosure generally relate to user friendly models in a cloud-based environment, and, more specifically, to models that increase energy efficiency in a cloud-based environment.

BACKGROUND

Cloud based services represent a paradigm for offering different kinds of web services, which can be dynamically developed, composed, and deployed on a virtualized infrastructure. Typical examples of Cloud-based services include Software as a Service (SaaS), Platform as a Service (PaaS) and infrastructure as a Service (IaaS). In such services, generally, a service provider facilitates large pools of high performance computing resources and high capacity storage devices, which are shared among different users. Specifically, the different users share a set of centrally managed resources, rather than owning and managing their own systems.

Cloud-based services are expanding, and the rate of global energy consumption in these services is growing at the rate of about 12%. Further, the current overall energy consumption associated with cloud-based services is about 1.5-2% of the global energy production. Therefore, maintaining energy efficiency in cloud-based services has become imperative, and, controlling the amount of energy consumption in such services can lead to a major cost reduction factor for cloud-service providers.

The issue of energy efficiency in information technology equipment has been receiving increasing attention in recent years and there is a growing recognition of the need to save energy. Therefore, many cloud service providers are focusing on, and adopting different measures to increase energy efficiency. Some cloud service providers have attempted to reduce energy consumption by minimizing the usage of underlying resources, such as servers, storage systems, network bandwidth, and virtualization layers. However, such attempts heavily rely on the volume of service requests received from the users, and are only partially successful. Existing technologies have substantially focused on building methodologies in the underlying infrastructure that aim to reduce energy consumption. Unfortunately, the users in a cloud-based environment have very little knowledge of how the choice of a service affects the overall energy consumption. In other words existing cloud-based services are offered to users without requiring the user to have knowledge of the energy required for delivering such services. Specifically, when the services are hosted on a cloud, the solutions provide very little or no knowledge to the user about the energy consumption required for using a cloud based service. Such a model for saving energy fails to motivate the users to choose an energy efficient option.

Some green operations have focused on a "users-in-loop" approach to some extent. The "users-in-loop" approach involves the user in the energy saving process, by providing transparency to the energy consumption in the infrastructure, unlike other approaches mentioned above. For example, the 'Share Print' technology in the field of document printing services, promotes the sharing of printed material among users by providing some kind of incentives for avoiding document printing. However, an effective solution requires a more comprehensive configuration at the service layer because of multi-dimensional dependencies of configuration parameters on the green operation.

Therefore, considering the problems mentioned above, a need exists for an effective solution in a cloud-based environment, which may significantly reduce the energy usage during delivery of cloud-based services to different users.

SUMMARY

The cloud-based environment can be thought of as a cloud-service market place where users purchase cloud-based services. The present disclosure provides a method for saving energy and improving energy efficiency in a cloud-based environment. The method provides a user-friendly platform, which actively involves the user in the energy saving process.

One aspect of the present disclosure provides a method for saving energy in a cloud based environment where a user requests a specific cloud based service from a cloud service provider. The method receives inputs pertaining to delivering the cloud-based service, from the user, through a graphical user interface that the user interacts with. The inputs may include one or more of the type of service to be delivered, a time frame for using the service, an energy efficiency level pertaining to the service, and a desired performance level. Further, the method allocates resources to the user, for delivering the requested cloud-based service. The number of resources allocated depends on the inputs received from the user. An operating energy cost incurred by the service provider, for delivering the requested cloud-based service, may then be calculated. The method may then calculate an actual price for delivering the requested service. The actual price may be pre-determined using various methods such as static pricing method, the bid price method, dynamic pricing method, etc. A profit contribution of the user may then be calculated. The profit contribution depends on the actual price and the operating energy cost of the service. Finally, a share is provided to the user as an incentive or a potential reward, for saving energy in the cloud-based environment, which may be based on the profit contribution of the user.

Another aspect of the present disclosure provides a method for saving energy by multiple users requesting cloud-based services from a cloud service provider. The method receives inputs pertaining to the delivery of the service from each of the users. The inputs received from each user may include a type of the cloud based service, a time frame for using the service, and an energy efficiency level or a performance level. Further, the method allocates the resources for delivering different services to each of the users. An actual price of the service and an operating energy cost for delivering the service to each individual user is then calculated. A sum of the actual prices and a sum of the operating energy costs of the different services is calculated. Further, the method calculates the profit contribution of each of the users and a sum of the profit contributions of all the users. The overall profit of the service provider after delivering the different services is calculated. A fraction of the overall profit is distributed as a cumulative incentive to the users. An individual incentive from the cumulative incentive is provided to each of the users. The individual incentive for each user is proportional to the profit contribution of that user.

DETAILED DESCRIPTION

The following detailed description is made with reference to the figures. Preferred embodiments are described to illustrate the disclosure, and not to limit its scope, which is defined by the claims. Those of ordinary skill in the art will recognize a variety of equivalent variations of the description that follows.

In the various embodiments of the present disclosure, the following terms have the indicated meanings/definitions:

Green-Point Scale:

Refers to a virtual scale rendered on a graphical user interface for helping a user in making a decision on a specific cloud-based service. The scale represents adjustable values lying within a specific range. Each value within the range pertains to a specific energy efficiency level that the user may choose, while requesting the service. A higher energy efficiency level on the 'green-point scale' corresponds to a higher energy saving, whereas a lower energy efficiency level on the 'green-point scale' corresponds to a lower energy saving. For example, if the scale represents values ranging from 1 to 10, then tuning the scale and setting it to a level of 9 would be more energy efficient than tuning it to a level of 7.

Performance Scale:

Refers to a virtual scale rendered on a graphical user interface for helping a user making a decision on a specific cloud-based service. The scale represents adjustable values lying within a specific range. Each value within the range pertains to a specific performance level that the user may choose, while requesting service. A higher performance level on the 'performance scale' corresponds to a lower energy saving, whereas a lower performance level on the 'performance scale' corresponds to a higher energy saving. For example, if the scale represents values ranging from 1 to 10, then setting the scale to a level of 1 would be more energy efficient than setting the scale to a level of 10.

Resources:

Refer to the equipment such as storage devices, servers, and racks required by the service provider fir delivery of different services requested by different users in the cloud-based environment.

Allocation of Resources:

Refers to the process of distribution of the resources to each user requesting delivery of a cloud-based service. The allocation of resources is partially dependent on the type of service requested b the user and the chosen energy efficiency level. For example, in a case where a specific user requests an urgent delivery of a specific cloud-based service and chooses a high performance level on a performance scale rendered on the user interface, a higher number of resources are allocated to that user and vice versa.

Operating Energy Cost:

The cost of the energy incurred by the service provider. This includes the cost associated with allocation of the resources corresponding to different demanded cloud-based services, the miscellaneous cost incurred for maintaining equipment.

Profit:

The profit of the service provider, in context of the present disclosure, is a value, or an equivalent of a value accrued to the service provider, as a consequence of the energy saved by different users requesting different cloud based services from the service provider, in the cloud based environment. More specifically, the total profit accruing to the service provider due to multiple users requesting different cloud-based service is indirectly, a measure of the total energy saved by the different users requesting different cloud-based services within a scheduled time period, in the cloud-based environment. In a similar manner, the profit accrued to the service provider, due to a single user, is a value benefited to the service provider, due to the energy saved by that user while requesting a specific cloud based service in the cloud based environment.

Incentive:

A value, including a financial value, or any other equivalent worth thereof, provided as a reward to a user for saving energy while requesting a cloud-based service in a cloud-based environment.

Provide:

This term, when comprehended in tight of the claimed invention, may be construed as communicating to a user, at any point of time, through any means, that funds/incentive, or any equivalents thereof, is available.

Overview

Cloud-based services, such as, Infrastructure as a Service, Platform as a Service and Software as a Service, use resources such as computing equipment, software, etc. These resources are centrally managed by a cloud-service provider and shared among a pool of users who pay to use the cloud-based services. Over recent years, there has been a high demand of these resources, and thus, a high energy demand associated with it. This high energy demand has a big impact on the environment, thus making the cloud-based services difficult to sustain.

There are three main contributing components of the cloud-based energy demands: the infrastructure specific energy demand in the infrastructure layer, the platform specific energy demand in the middleware or the virtualization layer, and the energy demand of the services in the service layer. The infrastructure specific energy demand is the energy required to keep the computing equipment (servers, racks, network switches) active and available to host the services, which depends on the power profiles of the computing equipment. The platform specific energy demand is the energy demanded by the system software running as a part of the middleware. Services specific energy demand is the energy consumption of the service used by the users, which depends on the type of service used and the duration for which the service is used.

Several green operations have attempted to decrease the energy consumption in the infrastructure and the platform layer but have experienced difficulties because the energy reduction is constrained by QoS (Quality of Service) parameters. On the other hand, energy reduction in the service layer can provide higher flexibility by enabling reduction in performance and hence enabling higher opportunity for energy savings, as is discussed in greater detail below.

The present disclosure provides a method for saving energy in a cloud-based environment. The method is user-friendly, and provides transparency to the users, thus, motivating them to save energy.

Exemplary Embodiments

Figure 1:
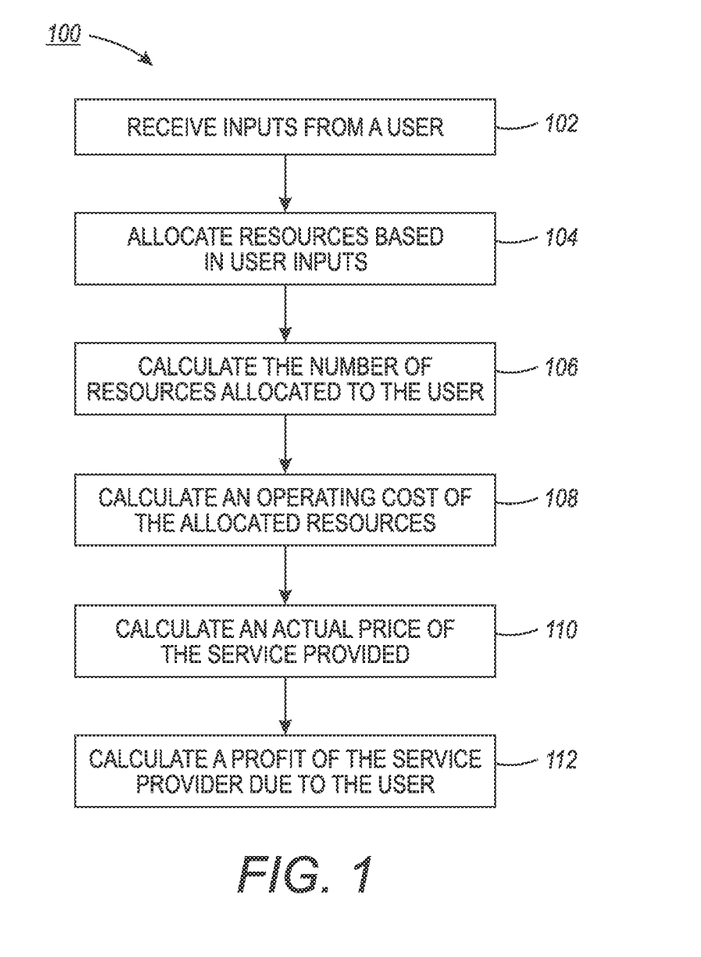
FIG. 1 is a flow chart for evaluating the profit contribution of a user, as the user requests a service and attempts to save energy in a cloud based environment, in accordance with the present disclosure.

FIG. 1 is a flowchart showing a method for computing an incentive for a user, as the user saves energy while requesting a cloud-based service in a cloud-based environment. This method 100 pertains to a case where a single user requests a cloud-based service within a scheduled time frame, in a cloud-based environment. To start with, the user logs on to an electronic device and connects to the cloud-based server through a suitable network. The electronic device may be any suitable device, such as, a computer, a handheld device or a laptop. The display of the electronic device renders a graphical user interface with which the user interacts, to provide the required inputs during a request for a cloud based service. As shown, at step 102, the method 100 receives an input from the user, pertaining to the delivery of a specific cloud-based service. The input may include, for example, the type of service requested, a time frame for using the service, an energy efficiency level or a performance level pertaining to the service. In a preferred embodiment, the graphical user interface renders one or more scales to enable the user to provide the input pertaining to the requested service. Specifically, for example, a green-point scale and a performance scale having levels ranging from one to ten are provided on the graphical user interface. Each level on the green point scale represents an energy efficiency level. Similarly, each level on the performance scale represents a specific performance level. A higher energy efficiency level corresponds to a lower performance level and vice versa. Alternatively, an energy efficiency scale having distinguishable marks corresponding to low, medium and high energy efficiency levels is provided on the graphical user interface. The user can choose any specific intermediate level ranging from low to high energy efficiency level, depending on the urgency of his demand. Similarly, a performance scale having low, medium and high performance levels may be provided. The scales are synchronized with each other, such that when the user adjusts one scale, the other scale automatically adjusts itself to a corresponding value. For example, as the user changes the green-point scale to set an energy efficiency level, the performance scale automatically adjusts itself to a performance level corresponding to the chosen energy efficiency level. The user can choose a higher efficiency level when the service requirement is not very urgent or choose a higher performance level when the service requirement is urgent. In an embodiment, the user can request delivery of inure than one cloud-based services and provide inputs pertaining to the delivery of each of those cloud-based services. Next, at step 104, the cloud-service provider allocates resources required by the user for a requested service. Typical examples of cloud-based resources are servers, software, storage devices, etc.

At step 106, the method calculates the number of resources allocated to the user for the requested service. The number of allocated resources depends on the input provided by the user. Specifically, for example, the number of resources allocated to the user changes as the user changes the energy efficiency or performance level. Those in the art will understand each type of service is provided a green point rating (analogous to energy star rating of electronic equipment in electronics marketplace) that indicates how energy efficient that service is. Further, the number of allocated resources decreases as the user increases the level on the green-point scale, and vice versa. At step 108, the method calculates an operating energy cost for allocating the resources pertaining to the requested service. The operating energy cost is directly dependent on the number of resources allocated, but not necessarily a linear function of the number. At step 110, the actual price for delivering the requested service to the user is calculated. The goal of the service provider is to identify and quote an appropriate actual price to the user, and maximize his revenue. At step 112, the method calculates a profit of the service provider due to the user, the profit being an outcome of the user's selection of a specific energy efficiency level while requesting the cloud-based service. Specifically, the profit of the service provider is the difference between the actual price of the service and the operating energy cost incurred by the service provider, for allocating the resources pertaining to the requested service. Thus, if the user saves a significant amount of energy by choosing a higher energy efficiency level, for a service, and compromises the performance level pertaining to service's delivery, then the profit of the service provider, as contributed by the user, is relatively high. Thus profit can be defined is a function of the energy saved by a user. In accordance with the present disclosure, an incentive is provided to the user for using the services efficiently. To achieve this a part of the profit contribution of the user is retained by the service provider, and the remaining part is offered to the user as an incentive. The calculation of the incentive will be explained in further detail, hereinafter.

Figure 2:
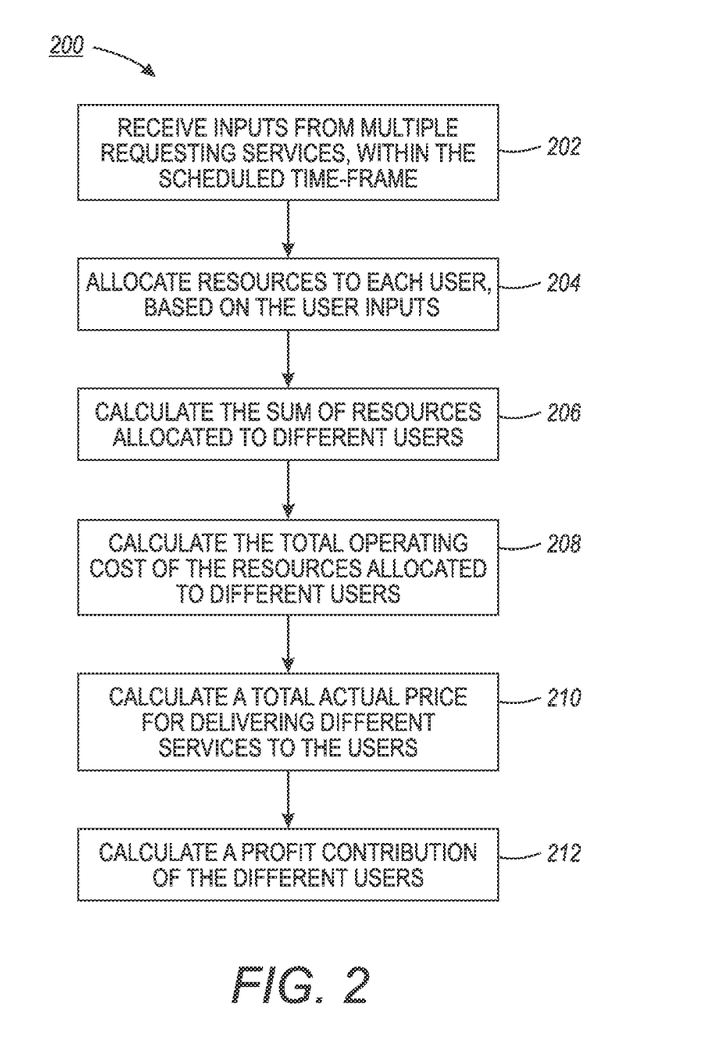
FIG. 2 is a flow chart illustrating a method for calculating the profit contributions of multiple users requesting different cloud-based services, and attempting to save energy in a cloud based environment.

FIG. 2 is a flowchart showing a method 200 for calculating the total incentive for multiple users requesting different cloud-based services within a specified time period, in a cloud-based environment. In such a case of multiple users, each user logs on to an electronic device and connects to a cloud server through a suitable network. The display of each electronic device renders a graphical user interface that enables the user of that device to interact with the cloud server. Each user requests the delivery of a specific cloud based service from the cloud server. As shown, at step 202, each user provides certain inputs pertaining to the cloud-based service that he/she desires to be delivered. As mentioned before, such an input may include a type of service to be delivered, an energy efficiency level pertaining to the service, or a performance level, etc. To provide the inputs, the users adjust the energy efficiency level on the green point scale, or the performance level on the performance scale. Inputs from the different users, on the green point scale and the performance scale, depend on their specific service requirements. As noted earlier, a specific user willing to request an energy efficient service may adjust the green point level at a relatively high value on the green point scale. Similarly, another user, willing to request a service urgently, may set a higher value on the performance scale.

Next, at step 204, the cloud service provider allocates resources required for delivering the requested services to each user. A specific number of resources are allocated to each user, depending at least on the type of service requested by the user. In a case where a specific user desires a service to be delivered urgently, the number of resources allocated for delivering that service is comparatively higher, and vice versa. At step 206, the method calculates the sum of the resources allocated to the different users within the scheduled time. The sum of the allocated resources is directly dependent on the number of users requesting the services within the scheduled time frame. At step 20, the method calculates the total operating energy cost of the resources allocated to the users. Specifically, the total operating energy cost is the sum of individual operating energy costs associated with delivering different requested services to the different users. Further, this cost is a function of the total resources allocated to the different users, though, not necessarily a linear function thereof.

Step 210 calculates the total actual price of the services requested by the users. The total actual price is the sum of the individual actual prices associated with the services provided to each user. This price depends on various factors, such as, the number of users requesting the services and is driven by market forces. Market forces may include the current market price and bidding for cloud services and resources. Step 212 calculates a total profit contribution of the users, which is the difference between the sum of the actual prices and the sum of the operating energy cost of the resources allocated to the different users. A part of the total profit contribution of the users is kept by the service provider, and the remaining part is offered to the users as an incentive, which will be explained in further details hereinafter.

Figure 3:
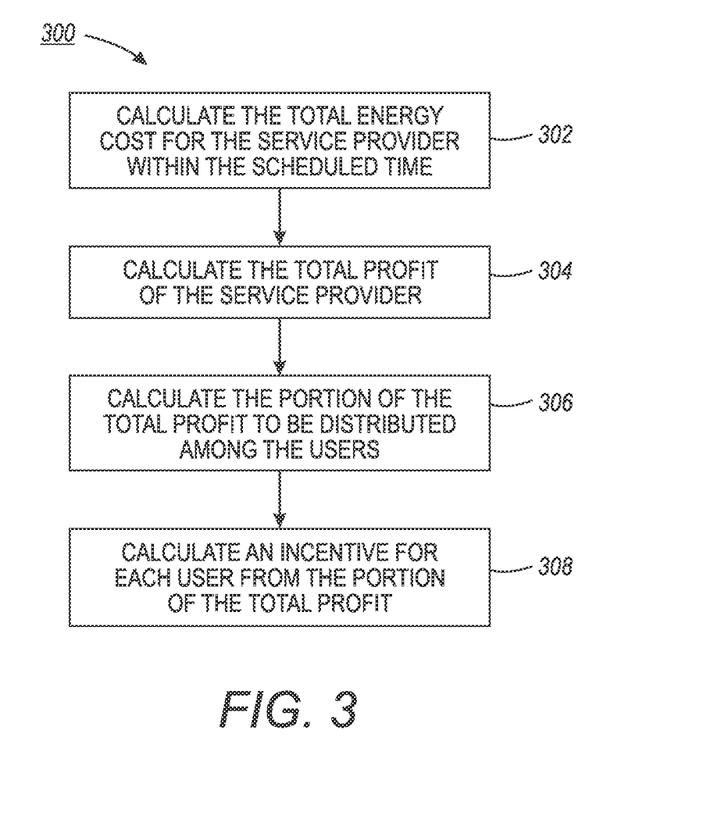
FIG. 3 is a flow chart for computing an incentive for each user, as a reward for saving energy in a cloud-based environment where multiple users request different cloud-based service, in accordance with the present disclosure.

FIG. 3 is a flowchart showing a method 300 for calculating the incentive to be rewarded to each user when there are multiple users requesting different services within the scheduled time frame. To start with, step 302 calculates the total operating energy cost incurred by the service provider within the scheduled time frame. The total operating energy cost incurred by the service provider is not necessarily equal to the total operating energy cost of the resources allocated to the different users, as calculated earlier in method 200 of FIG. 2. Specifically, the operating energy cost incurred by the service provider includes certain costs in addition to the costs of the resources delivered to the different users. The additional costs include the infrastructure specific costs, which is the cost incurred by the service provider to keep the computing equipment (servers, racks, network switches, etc) active and available to host the services. Other costs incurred by the service provider include the cost of the energy required by the cooling units to maintain different equipment in operating conditions.

Next, step 304 calculates the total profit of the service provider, which is the difference between the total price (calculated at step 210 earlier, in FIG. 2) of the services and the total operating energy cost incurred by the service provider. Further, step 306 calculates a portion of the total profit of the service provider to be distributed among the users. The percentage of the total profit to be distributed to the users is pre-determined by the service provider, and is based solely on the service provider's discretion. Finally, at step 308, the method calculates that out of the percentage of the profit to be distributed among the users, what traction should be provided as an incentive to each user. The incentive of each user is directly proportional to the profit contribution of that user (calculated earlier in method 100). Specifically, if the total profit of the service provider is denoted by $\pi_{total}$, the percentage of the total profit to be distributed among the different users is denoted by $\alpha$, and the profit contribution of a specific user i is $\pi_i$, then the incentive of the user i is calculated as follows:

$$\sigma_i = \frac{\pi_i}{\sum_{i=1}^{n} \pi_i} \alpha \pi_{total} \qquad (i)$$

Figure 4A:
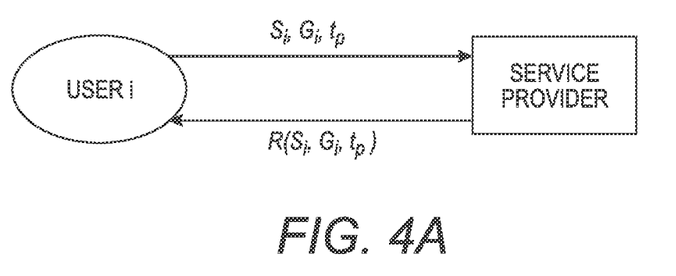
FIG. 4(a) is a diagram illustrating the service transaction between a cloud-service provider and multiple users requesting different cloud-based services in a cloud based environment, in accordance with the present disclosure.

FIG. 4A is a diagrammatic representation of the service transaction between a user i and the service provider. Typical examples of a cloud based service requested by the user I may include Software as a Service (SaaS), Platform as a Service (PaaS), Infrastructure as a Service (IaaS), etc. To request such a service, the user provides several input parameters pertaining to the service on a graphical user interface. The parameters may include the type of service $S_i$, time period $t_p$ for using the service, energy efficiency level $G_i$ pertaining to the service, etc. The user inputs are dependent on various factors, such as, the cost sensitivity or the service urgency of the user i, etc. Such factors drive the user's choice of input parameters mentioned above. For example, in a case where the user is cost sensitive, he/she requests a service which is economical. Parameters present on the graphical user interface, such as, the service type, the time frame the green point scale, and the performance level scale, help the user choose a desired service. Specifically, the user may receive considerable discounts when he/she chooses a higher energy efficiency level. Knowledge of the discount is one factor that substantially motivates any user to choose a higher energy efficiency level during requesting the service. On the other hand, when the user requires a service urgently, he/she chooses a lower energy efficiency level or a higher performance level. As mentioned earlier, the user can easily adjust the performance or energy efficiency level pertaining to the service, which enables the user to compare the options available to him/her. After the user sends the service request, the service provider allocates the resources to the user. The number of resources allocated to the user is represented by) $R(S_i,G_i,t_p)$, and is a function of the service type $S_i$, the time period $t_p$, and the energy efficiency level $G_i$ chosen by the user.

Figure 4B:
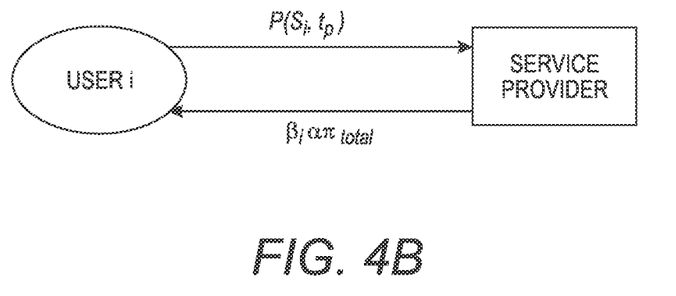
FIG. 4(b) illustrates the monetary (or credit) transaction between a cloud-service provider and multiple users requesting different cloud-based services in a cloud based environment, in accordance with the present disclosure.

FIG. 4B is a diagrammatic representation of the monetary transaction between the user and the service provider. As shown, the user i pays a price $P(S_i,t_p)$ for a requested service and receives an incentive $\sigma_i$ in return. The price $P(S_i,t_p)$ of the service is at least dependent on the type of service $S_i$ and the time period $t_p$ requested by the user i. The price $P(S_i,t_p)$ is pre-determined by the service provider using any one of the conventional methods, such as, static pricing, bid price model or the dynamic pricing. Effectively, the service provider chooses the price $P(S_i,t_p)$ such that it ensures him the maximum profit.

The incentive offered to the user i is calculated using a series of steps. First, the operating energy cost $C(R(S_i,G_i,t_p))$ of the number of resources $R(S_i,G_i,t_p)$ allocated to the user i is estimated. In an embodiment, certain regression methods based on historical data, for example, data pertaining to previous operating energy costs incurred while allocating resources to other users requesting a similar cloud based service in the past, may be used to calculate the operating energy cost $C(R(S_i,G_i,t_p))$ Next, the profit contribution $\pi_i$ of the use i s calculated as follows:

$$\pi_i = P(S_i,t_p) - C(R(S_i,G_i,t_p)) \qquad (ii)$$

For the case of multiple users requesting services within the given time period $t_p$, the sum of the prices $$\sum_{i=1}^{n} P(S_i, t_p)$$

of the requested services is calculated. Further the total operating energy cost $$C\left(\sum_{i=1}^{n} R(S_i, G_i, t_p)\right)$$

associated with the total number of resources, i.e., $$\sum_{i=1}^{n} R(S_i, G_i, t_p),$$

allocated to users for the requested services is calculated. The total profit contribution of the different users is then given by:

$$\sum_{i=1}^{n} \pi_i = \sum_{i=1}^{n} P(S_i, t_p) - \sum_{i=1}^{n} C(R(S_i, G_i, t_p)) \quad \text{(iii)}$$

Then, the ratio of the profit contribution of the user i, to the total profit contribution of different users (denoted by β), is calculated as follows:

$$\beta_i = \left(\pi_i \bigg/ \sum_{i=1}^{n} \pi_i\right) \quad \text{(iv)}$$

Effectively, the ratio $\beta_i$ represents the profit contribution of the user i relative to the total profit contribution of the different users.

To calculate the incentive $\sigma_i$ for each user i, the service provider decides a percentage of its total profit, to be distributed among the different users. If this percentage is α, then the amount distributable as an incentive among the different users is $\alpha\pi_{total}$, $\pi_{total}$ being the total profit of the service provider. Further, the remaining percentage can be retained by the service provider. For example, if the service provider decides to keep 90% of the profit and distribute the remaining 10% of the profit to the users, then α=0.1 and (1−α)=0.9. Next, the total operating energy cost $C_{total}$ incurred by the service provider is calculated. The total operating energy cost $C_{total}$ is the sum of the operating energy cost of the resources delivered to the users and other miscellaneous costs $C_{misc}$ incurred by the service provider. The total operating energy cost is represented as follows:

$$C_{total} = C\left(\sum_{i=1}^{n} R(S_i, G_i, t_p)\right) + C_{misc} \quad \text{(v)}$$

Next, the total profit $\pi_{total}$ of the service provider is calculated. The total profit of the service provider is calculated by subtracting the total operating energy cost from the total price of the services provided to different users. Hence, the total profit of the service provider is given by:

$$\pi_{total} = \sum_{i=1}^{n} P(S_i, t_p) - C_{total} \quad \text{(vi)}$$

Finally, the incentive $\sigma_i$ of each user i is calculated. The incentive of each user i is a portion of the total profit $\pi_{total}$, and proportional to the percentage share α, and the ratio $\beta_i$. Specifically, the incentive $\sigma_i$ is a product of the total profit $\pi_{total}$, the percentage share α, and the ratio $\beta_i$, given as follows:

$$\sigma_i = \beta_i * \alpha * \pi_{total} \quad \text{(vii)}$$

The method and the system of the present disclosure, for improving energy efficiency in cloud based environment is extremely beneficial for both the cloud-service provider and the different user requesting the cloud based services, as it provides a specific incentive to each user for saving energy, and hence motivates the users to choose energy efficient option. Further, the service provider is also benefited as the choice of energy efficient cloud-based services substantially increase the service provider's revenue.

Although the current invention has been described comprehensively, in considerable details to cover the possible aspects and embodiments, those skilled in the art would recognize that other versions of the invention may also be possible.

What is claimed is:

1. A method for saving energy in a cloud-based computing environment, wherein the environment includes a cloud-based server configured to communicate to a user via a user interface displayed on a user device, the method comprising:
   transmitting for display a user interface adapted to render web-based content pertaining to delivery of a cloud-based service;
   accepting one or more user inputs requesting delivery of the cloud-based service to the user, at least one input including an energy efficiency level pertaining to the delivery of the requested cloud-based service;
   allocating, using a server, resources for delivering the cloud-based service, based on the energy efficiency level;
   calculating a profit of the cloud service provider associated with providing the service, and
   providing a value as an incentive to the user, the value being directly proportional to the calculated profit, and being dependent on the number of resources allocated for delivery of the cloud-based service to the user and a pre-determined price set for delivering the cloud-based service to the user.

2. The method of claim 1, wherein the profit is calculated based on an actual price of the cloud-based service and an operating energy cost incurred by the service provider for delivering the cloud-based service.

3. The method of claim 1, wherein the incentive provided to the user is dependent on the energy efficiency level and a performance level selected by the user.

4. The method of claim 1, wherein the incentive provided to the user is a fraction of the profit of the service provider.

5. The method of claim 2, wherein the operating energy cost depends at least on the number of resources allocated for delivering the requested cloud-based service.

6. The method of claim 1, wherein a plurality of users provide inputs for the delivery of cloud-based services, each user requesting delivery of a specific cloud-based service.

7. The method of claim 5, further comprising, calculating a sum of the actual prices for delivering the requested cloud-based services to the plurality of users.

8. The method of claim 6, further comprising, allocating a specific number of resources to each user requesting delivery of a specific cloud-based service based on the requested energy efficiency level or a performance level, and calculating a sum of the total number of resources allocated to the plurality of users.

9. The method of claim 7, further comprising, calculating a total operating energy cost for delivering the requested cloud based services to the plurality of users, the total operating energy cost being dependent on the sum of the total number of resources allocated to the plurality of users.

10. The method of either of claim 8 or 9, further comprising:
calculating a sum of the actual prices for delivering the requested cloud-based services to the plurality of users; and
calculating a total profit contribution of the plurality of users, the total profit contribution being dependent at least on the sum of the actual prices and the total operating energy cost for delivering the requested cloud based services to the plurality of user.

11. The method of claim 10, wherein the total profit is calculated as the difference between the sum of the actual prices for delivering the requested cloud-based services to the plurality of users, and the total operating energy cost incurred by the service provider.

12. The method of claim 11, further comprising, determining a fraction of the total profit of the service provider to be distributed as an incentive among the plurality of users, the fraction being pre-determined by the service provider.

13. The method of claim 12, further comprising, calculating a share to be allocated to each of the plurality of users from the incentive, the share of each user being in proportion to an individual contribution of that user to the total profit of the service provider.

* * * * *

UNITED STATES PATENT AND TRADEMARK OFFICE
CERTIFICATE OF CORRECTION

| | | |
|---|---|---|
| PATENT NO. | : 8,849,695 B2 | Page 1 of 1 |
| APPLICATION NO. | : 13/586180 | |
| DATED | : September 30, 2014 | |
| INVENTOR(S) | : Haengju Lee, Gueyoung Jung and Tridib Mukherjee | |

It is certified that error appears in the above-identified patent and that said Letters Patent is hereby corrected as shown below:

On the Title Page

Item (73) should read, Assignee: Xerox Corporation, Norwalk, CT USA

Signed and Sealed this
Twenty-fourth Day of February, 2015

Michelle K. Lee
*Deputy Director of the United States Patent and Trademark Office*